United States Patent
Jin et al.

(10) Patent No.: US 9,124,788 B2
(45) Date of Patent: Sep. 1, 2015

(54) SPHERICAL CAMERA

(71) Applicant: Zhejiang Uniview Technologies Co., Ltd, Hangzhou (CN)

(72) Inventors: Kaiyan Jin, HangZhou (CN); Shouliang Yang, HangZhou (CN)

(73) Assignee: ZheJiang Uniview Technologies CO., Ltd, HangZhou (CN)

( * ) Notice: Subject to any disclaimer, the term of this patent is extended or adjusted under 35 U.S.C. 154(b) by 0 days.

(21) Appl. No.: 14/402,102

(22) PCT Filed: Jul. 23, 2013

(86) PCT No.: PCT/CN2013/079925
§ 371 (c)(1),
(2) Date: Nov. 18, 2014

(87) PCT Pub. No.: WO2014/015796
PCT Pub. Date: Jan. 30, 2014

(65) Prior Publication Data
US 2015/0108724 A1    Apr. 23, 2015

(30) Foreign Application Priority Data
Jul. 26, 2012   (CN) ...................... 2012 2 0366804 U

(51) Int. Cl.
*H04N 5/225*    (2006.01)
(52) U.S. Cl.
CPC ............ *H04N 5/2252* (2013.01); *H04N 5/2251* (2013.01)
(58) Field of Classification Search
CPC ........................... H04N 5/2252; H04N 5/2251
See application file for complete search history.

(56) References Cited

U.S. PATENT DOCUMENTS

| 5,153,623 | A * | 10/1992 | Bouvier ................. 396/427 |
| 7,963,707 | B2 | 6/2011 | Jung et al. |
| 2005/0122419 | A1* | 6/2005 | Yoon ..................... 348/360 |
| 2005/0206779 | A1* | 9/2005 | Aoki et al. .............. 348/373 |
| 2007/0058065 | A1* | 3/2007 | Saiki ..................... 348/335 |
| 2008/0008467 | A1* | 1/2008 | Liu ....................... 396/427 |
| 2008/0079848 | A1* | 4/2008 | Kung et al. .............. 348/373 |
| 2011/0299843 | A1* | 12/2011 | Tamura et al. ........... 396/72 |

FOREIGN PATENT DOCUMENTS

| CN | 201207118 Y | 3/2009 |
| CN | 101635792 B | 1/2010 |
| CN | 102080756 B | 6/2011 |
| CN | 202095006 U | 12/2011 |
| CN | 102359700 A | 2/2012 |
| CN | 202306102 U | 7/2012 |
| CN | 202696749 U | 1/2013 |

* cited by examiner

*Primary Examiner* — W B Perkey
(74) *Attorney, Agent, or Firm* — Alleman Hall McCoy Russell & Tuttle LLP

(57) ABSTRACT

Provided is a spherical camera, including a first shell, a second shell, and a first waterproof ring installed at the joint of the first shell and the second shell; the first shell comprises a first rotating shaft; the second shell comprises a second rotating shaft; the first rotating shaft and the second rotating shaft fit with an support bracket for installing the spherical camera, to allow the spherical camera to rotate to different areas to acquire images; the first waterproof ring is a planar closed-loop waterproof ring; the combination surface between the first shell and the second shell is a plane, and the combination plane passes through the sphere center of the spherical camera.

6 Claims, 4 Drawing Sheets

US 9,124,788 B2

SPHERICAL CAMERA

CROSS-REFERENCE

The present application is a U.S. National Phase of International Application No. PCT/CN2013/079925, filed on Jul. 23, 2013, which claims priority to Chinese Patent Application No. 201220366804X, filed with the Chinese Patent Office on Jul. 26, 2012, the entire contents of each of which are hereby incorporated by reference for all purposes.

TECHNICAL FIELD

The present invention is related to the spherical camera design, especially to the shell structure design of the spherical camera, which has a better sealing effect and more convenient for installation.

BACKGROUND

The IR high-speed spherical camera is a very common camera in security surveillance, which is mainly used outdoors, so its waterproof effect is especially important. Usually the waterproof level needs to be up above IP66. There will be more or less moisture inside the IR high-speed spherical cameras after a long term usage. The main reason causing the phenomenon is: the sealing effect of the shell is not good enough or the temperature difference is not taken into account when assembling the product. Once the waterproof effect of the IR spherical camera is not good, a large amount of internal moisture may likely cause the inside PCB to be short-circuit and so on, while the internal moisture will greatly reduce the life of the camera.

Please refer to FIGS. 1 and 3, the rotation cavity of the IR spherical camera of the prior arts is mainly formed by the three sections: a front cover 11, the left cover 15a and the right cover 15b. There are waterproof rings (upper waterproof ring 12, lower waterproof ring 14) installed in the connection between each section to achieve the effect of waterproof. The connection between the left cover 15a and the right cover 15b is installed by the non-annular lower waterproof ring 14 (referring to an enlarged view of FIG. 3).

Please refer to FIGS. 2 and 4, the rotation cavity of another IR spherical camera of the prior arts is mainly formed by the three sections: a front cover 21, the middle cover 23 and the lower cover 25. There are waterproof rings (22, 24) installed in the connection between each section to achieve the effect of waterproof. The connection between the middle cover and the lower cover is installed by the irregular waterproof ring (referring to an enlarged view of FIG. 4) to proof the water.

Firstly, the use of non-circular waterproof ring cannot achieve the completely sealing, and rain or moisture is likely to enter the rotation cavity of the IR spherical camera, which impacts the product life. Secondly, in the contact between the middle cover and lower cover of the second prior art, the contact must be non-regular (non-planar) because of the shell molding requirements and the location of the shaft. The irregular waterproof ring is not only difficult to install, easy to distort or loose, making it difficult to guarantee the achievement of complete sealing. Also, the waterproof ring is usually adopted by rubber or silicone material which is easily deformed. Once the waterproof ring is deformed, it will easily lead to sealing failure.

SUMMARY OF THE INVENTION

The present invention provides a spherical camera. The spherical camera includes the first shell, the second shell, and the first waterproof ring arranged at the joint of the first shell and the second shell. The first shell includes the first rotating shaft, and the second shell includes the second rotating shaft. The first rotating shaft and the second rotating shaft are fitted with the support bracket of the spherical camera to allow the spherical camera to rotate to different areas to collect images. The first waterproof ring is a planar closed-loop waterproof ring. The combination surface between the first shell and the second shell is a plane, which forms the combination plane passing through the sphere center of the spherical camera.

Preferably, the spherical camera further includes the third shell and the second waterproof ring arranged at the joint of the third shell and the second shell. The second waterproof ring is a planar closed-loop waterproof ring. The second shell is between the first shell and the third shell, and the combination surface between the third shell and the second shell is a plane.

Preferably, the first shell, the second shell, and the third shell are respectively the rear shell, the middle shell, and the front shell of the spherical camera.

Preferably, the spherical camera further includes a plurality of bolts, and the first shell includes a plurality of screw holes. The second waterproof ring includes a plurality of nuts in the corresponding position inside, which is provided to screw the bolts into the nuts through the screw holes to fasten the third shell, the second waterproof ring and the second shell together.

Preferably, the first waterproof ring includes the fixed portion. The fixed portion is fitted with the corresponding joint portion of the first shell or the second shell to fasten the first waterproof ring on the first shell or on the second shell.

Preferably, the first or the second waterproof ring is made of the insulating material.

In the present utility model, the combination surface between the shells is a plane so as to allow the waterproof ring to be designed as a closed planar annular shape. Therefore, the problems of poor sealing effect caused by the curved-surface waterproof ring in the prior arts could be effectively avoided.

DETAILED DESCRIPTION

Due to the shape of the waterproof ring is closely related to the shape and structure of the spherical camera shell, the design both for the spherical camera shell as well as the corresponding waterproof ring is a problem needing to be studied when solving the problem of the waterproof of the spherical camera.

Figure 5:
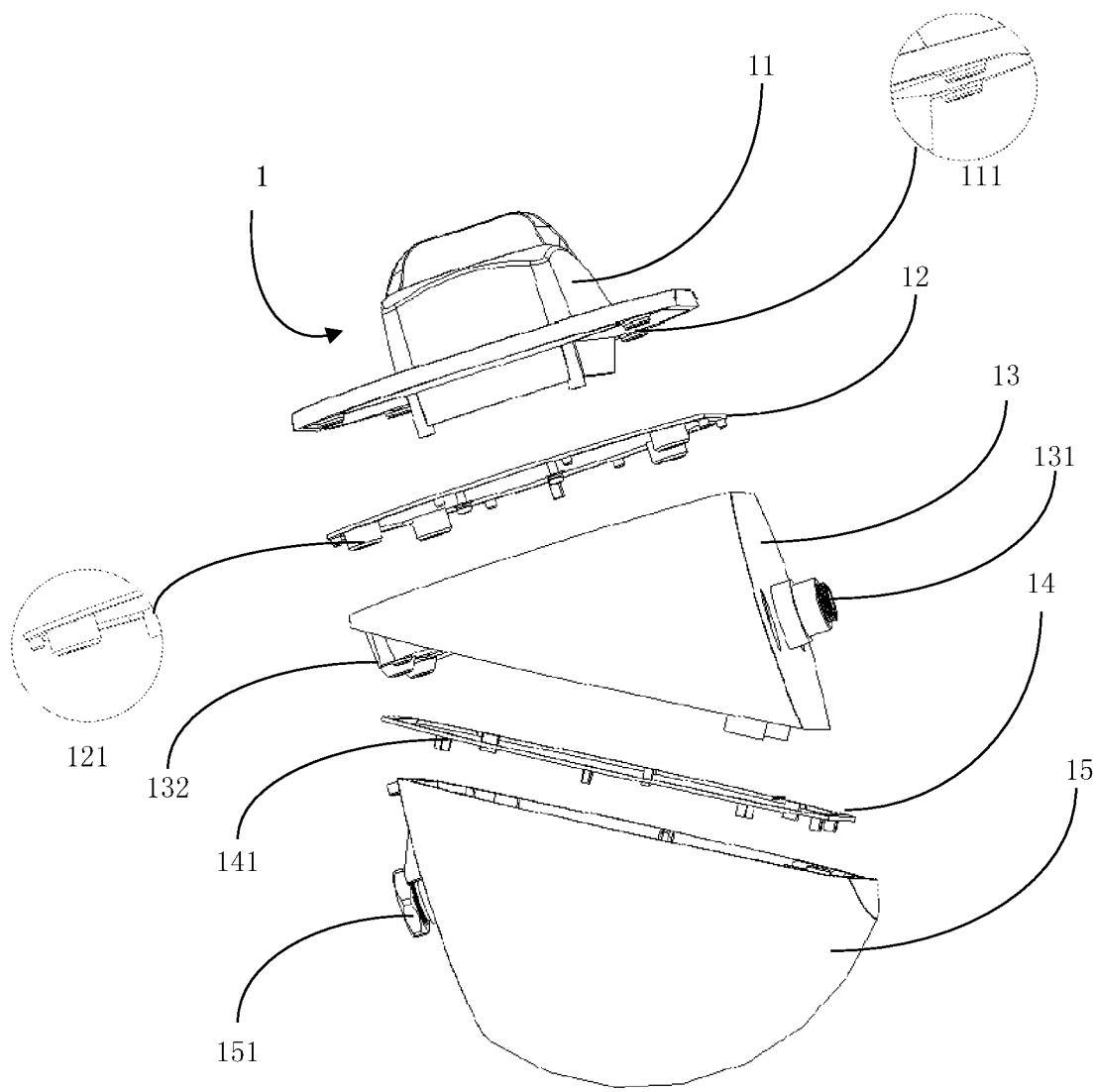
FIG. 5 is an exploded view of a spherical camera in the present utility model.
Figure 6:
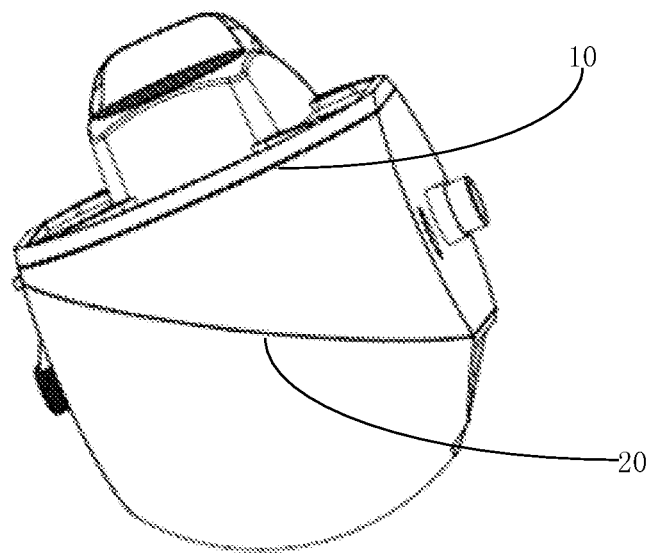
FIG. 6 is a three-dimensional view showing the spherical camera in FIG. 5.

Please refer to FIGS. 5 and 6, the spherical camera shell of the present utility model includes the front shell 11, the upper waterproof ring 12, the middle shell 13, the lower waterproof ring 14 and the rear shell 15. The upper waterproof ring 12 is planar with a closed loop shape, installed between the lower surface of the front shell 11 and upper surface of the middle shell 13. The lower waterproof ring 14 is planar with a closed loop shape, installed between the lower surface of the middle shell 13 and the upper surface of the rear shell 15. The front shell 11 is mounted on the upper surface of the middle shell 13, and the middle shell 13 is mounted to the upper surface of the rear shell 15. The upper waterproof ring 12 and the lower waterproof ring 14 were installed at the joint between the shells.

The middle shell 13 and the rear shell 15 respectively includes a first rotating shaft 131 and second rotating shaft 151. When the spherical camera is mounted on the bracket and used, the spherical camera may rotate on the mounting bracket taking advantage of the rotating shaft to capture an image in different regions. In the present utility model, both the upper surface of the middle shell 13 and the lower surface of the rear shell 15 are annular plane, and the combination plane 20 of two passes through the center of the spherical camera. That is to say, the center of the spherical camera 1 is on the combination plane 20 between the middle shell 13 and the rear shell 15. Furthermore, due to the combination plane of the middle shell 13 and the rear shell 15 passes through the center of the sphere, it will not have a negative impact on the molding. When the combination plane is away from the center of the sphere, it is difficult to remove the middle shell and the rear shell from the mold. Because such design would always lead an aperture of a spherical die where the diameter is smaller than the diameter of the spherical camera, which will cause the shell cannot be removed from the mold.

Figure 1:
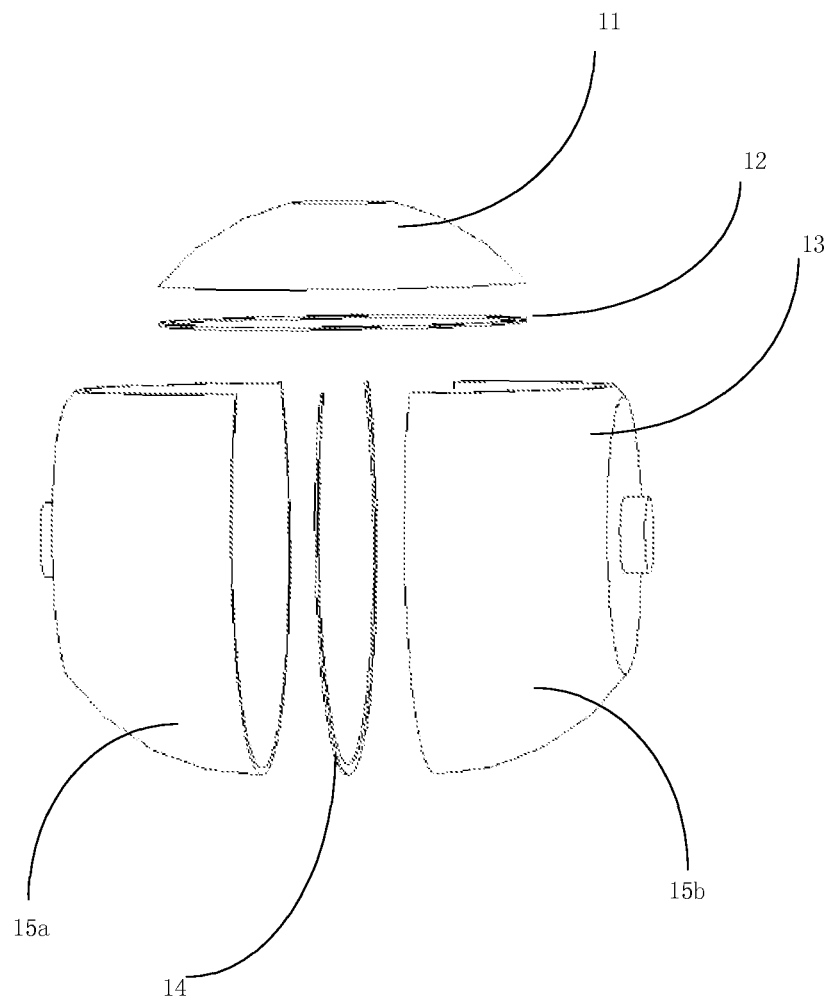
FIG. 1 is an exploded view of a spherical camera shell of the prior arts.
Figure 2:
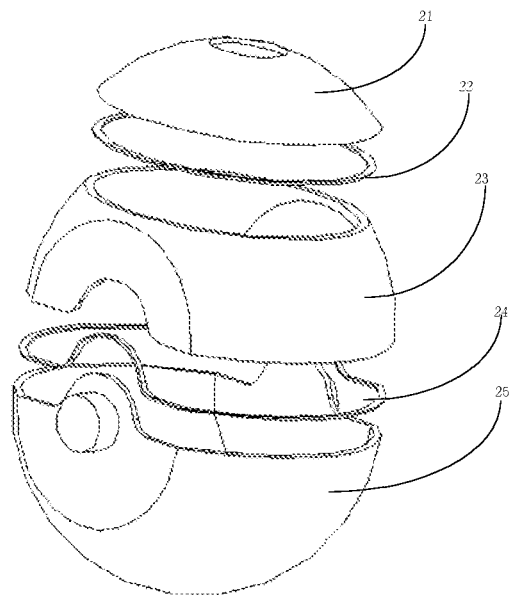
FIG. 2 is an exploded view of another spherical camera shell of the prior arts.
Figure 3:
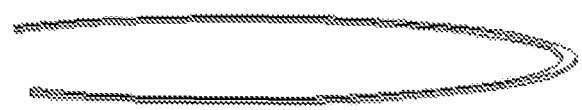
FIG. 3 is a three-dimensional view showing the waterproof ring of a spherical camera of the prior arts.
Figure 4:
FIG. 4 is a three-dimensional view showing the waterproof ring of another spherical camera of the prior arts.

In such shell design according to the present utility model, the waterproof ring 14 may be made in plane. The planar waterproof ring is more convenient for installation in compare with the irregular shape of the waterproof ring in FIG. 4. In the present techniques, when dividing the middle shell and the rear shell, it is necessary to bypass the shaft to prevent passing through the shaft, which results in the irregular combination between the two shells rather than the plane combination such as shown in FIG. 2. Since the present utility model using the halved crosswise way to obliquely cut through the center of the sphere, which effectively avoids the irregular combination between the middle shell 13 and the rear shell 15. Please further refer to FIG. 5, the lower waterproof ring 14 further includes the first fixed portion 141. The fixing portion 141 is mounted to the corresponding joint portion (not shown) of the middle shell 13 or the rear shell portion 15, to fasten the waterproof ring 14 to the middle shell 13 or the rear shell 15 in order to prevent the waterproof ring loosening.

The combination surface 10 between the front shell 11 and the middle shell 13 is also planar. Since the problem of irregular combination does not exist between the front shell 11 and the middle shell 13, the waterproof ring can also be designed as a planar closed-loop. In the present utility model, the front shell 11 is a flat shell which includes a plurality of first perforations 111. There is a plurality of the second perforations 121 (for example, the number is 4) inside the upper waterproof ring 12, where the position is corresponding to the first perforation 111. When the upper waterproof ring is mounted between the front shell 11 and the middle shell 13, the installer may tighten the screw into the corresponding screw seat in the middle shell 13 through the first perforation 111 of the front shell 11 and the corresponding second perforations 121 of the upper waterproof ring 12, in order to fix the front shell 11, the upper waterproof ring 12, and the middle shell 13. Therefore, the effect of fastening the upper waterproof ring 12 can be achieved. In the present utility model, the middle shell 13 and the rear shell 15 is combined as a planar combination, which allows the waterproof ring being designed as a planar closed-loop, effectively avoiding the problem of poor sealing effect due to the curved waterproof ring. Further, in a preferred embodiment, each waterproof ring may be made in insulation materials to form a waterproof-insulation ring for thermal isolation. Therefore, the effect of the heat generated by the infrared light to other devices in the camera could be effectively reduced.

The foregoing descriptions are only examples of the present disclosure and are not for use in limiting the protection scope thereof. Any modification, equivalent replacement and improvement made under the spirit and principle of the present disclosure should be included in the protection scope thereof.

The invention claimed is:

1. A spherical camera, comprising: a first shell, a second shell, and a first waterproof ring arranged at a joint of the first shell and the second shell, wherein
the first shell includes a first rotating shaft, the second shell includes a second rotating shaft, the first rotating shaft and the second rotating shaft being fitted with a support bracket of the spherical camera to allow the spherical camera to rotate to different areas to collect images, the first water-proof ring being a planar closed-loop waterproof ring, a combination surface between the first shell and the second shell being a plane, which forms a combination plane passing through the sphere center of the spherical camera.

2. A spherical camera in accordance with claim 1, wherein the spherical camera further comprises a third shell and a second waterproof ring arranged at a joint of the third shell and the second shell, the second waterproof ring being a planar closed-loop waterproof ring, the second shell being between the first shell and the third shell, and a combination surface between the third shell and the second shell is a plane.

3. A spherical camera in accordance with claim 1, wherein the first shell, the second shell, and the third shell are respectively the rear shell, the middle shell, and the front shell of the spherical camera.

4. A spherical camera in accordance with claim 2, wherein the third shell comprises a plurality of first perforations and the second waterproof ring comprises a plurality of second perforations correspondingly, a plurality of screws being screwed into the plural screw seats on the second shell by passing through the first perforations and the second perforations to fastening the third shell, the second waterproof ring and the second shell together.

5. A spherical camera in accordance with claim 1, wherein the first waterproof ring comprises a fixed portion, the fixed portion being provided with a corresponding joint portion of the first shell or the second shell to fasten the first waterproof ring on the first shell or the second shell.

6. A spherical camera in accordance with claim 1, wherein the first or the second waterproof ring is made of insulating material.

* * * * *